United States Patent
Alroaithi et al.

(10) Patent No.: US 12,215,187 B2
(45) Date of Patent: Feb. 4, 2025

(54) CONTINUOUS MANUFACTURING OF POLYOL

(71) Applicant: Saudi Aramco Technologies Company, Dhahran (SA)

(72) Inventors: Mohammad S. Alroaithi, Thuwal (SA); Hussain M. Yami, Thuwal (SA); Ola Ali, Thuwal (SA); Wei Xu, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 400 days.

(21) Appl. No.: 17/573,108

(22) Filed: Jan. 11, 2022

(65) Prior Publication Data

US 2022/0220252 A1 Jul. 14, 2022

Related U.S. Application Data

(60) Provisional application No. 63/136,505, filed on Jan. 12, 2021.

(51) Int. Cl.
| | |
|---|---|
| C08G 64/02 | (2006.01) |
| B01J 19/00 | (2006.01) |
| B01J 19/18 | (2006.01) |
| C08G 64/20 | (2006.01) |
| C08G 64/34 | (2006.01) |
| C08G 64/40 | (2006.01) |
| C08G 65/26 | (2006.01) |

(52) U.S. Cl.
CPC ...... *C08G 64/0208* (2013.01); *B01J 19/0066* (2013.01); *B01J 19/18* (2013.01); *C08G 64/205* (2013.01); *C08G 64/34* (2013.01); *C08G 64/403* (2013.01); *C08G 65/26* (2013.01); *C08G 65/2642* (2013.01); *B01J 2219/00164* (2013.01); *B01J 2219/00166* (2013.01)

(58) Field of Classification Search
CPC .. C08G 64/0208; C08G 64/205; C08G 64/34; C08G 64/403; C08G 65/26; C08G 65/2642; B01J 19/0066; B01J 19/18; B01J 2219/00164; B01J 2219/0066; B01J 2219/00166

See application file for complete search history.

(56) References Cited

U.S. PATENT DOCUMENTS

| | | |
|---|---|---|
| 2011/0054145 A1 | 3/2011 | Chang et al. |
| 2011/0201779 A1 | 8/2011 | Cherian et al. |
| 2011/0230580 A1 | 9/2011 | Allen et al. |
| 2013/0211042 A1 | 8/2013 | Gurtler et al. |
| 2021/0277181 A1 | 9/2021 | Wohak et al. |

FOREIGN PATENT DOCUMENTS

| | | | |
|---|---|---|---|
| EP | 3617248 A1 | 3/2020 | |
| WO | WO-2010/022388 A2 | 2/2010 | |
| WO | WO-2010/033703 A1 | 3/2010 | |
| WO | WO-2010028362 A1 * | 3/2010 | ............ B01J 31/02 |
| WO | WO-2012/037282 A2 | 3/2012 | |
| WO | WO-2013/012895 A1 | 1/2013 | |
| WO | WO-2013/022932 A1 | 2/2013 | |
| WO | WO-2013/096602 A1 | 6/2013 | |
| WO | WO-2014/031811 A1 | 2/2014 | |
| WO | WO-2022/153149 A1 | 7/2022 | |

OTHER PUBLICATIONS

International Search Report for PCT/IB2022/050101, 4 pages (mailed Apr. 12, 2022).

* cited by examiner

*Primary Examiner* — Rabon A Sergent
(74) *Attorney, Agent, or Firm* — Osha Bergman Watanabe & Burton LLP

(57) ABSTRACT

A method of continuously producing a polyol includes: (i) feeding a solid catalyst into a continuous stirred tank reactor (CSTR); (ii) contacting a reaction mixture comprising one or more epoxides and carbon dioxide with the solid catalyst and a chain transfer agent comprising a plurality of sites capable of initiating copolymerization of epoxides and carbon dioxide in the CSTR; (iii) allowing polymerization reaction to proceed until a desired molecular weight polyol has formed; and (iv) terminating the polymerization reaction.

13 Claims, 5 Drawing Sheets

Gel permeation chromatogram (top) and molar mass distribution (bottom) of HY-B457-27-2.

CONTINUOUS MANUFACTURING OF POLYOL

RELATED APPLICATIONS

This application claims priority to U.S. Provisional Application No. 63/136,505 filed on Jan. 12, 2021, the entire contents of which are hereby incorporated by reference.

FIELD

The subject matter described herein relates to apparatuses, methods, and systems for manufacturing of polyols.

BACKGROUND

Certain polyols can be prepared by copolymerization of $CO_2$ and epoxides. Such polyols are typically synthesized via a batch process. The advantages of the batch process lie with its versatility. For example, a single vessel can carry out a sequence of different operations without the need to break containment. However, the batch process can incur high labor costs per batch, and result in inconsistent product quality from batch to batch. Different processes for producing polyol, particularly in an industrial settings, often lead to high relative operational costs and excessive variation in output performance.

SUMMARY

The present disclosure provides compositions of polycarbonate polyols, as well as methods and systems for producing polycarbonate polyols. Polyols are used in combination with isocyanates in the production of polyurethanes. For example, in certain applications, polyether polyols, polyester polyols, and polycarbonate polyols are used in polyurethane compositions. In one aspect, polycarbonate polyols are derived from a polyol initiator compound whereby homogenous chain-growth polymerization initiates from each functional end group of the polycarbonate polyol initiator compound.

Among other things, the present disclosure identifies the source of at least one problem in certain processes for the synthesis of polyols, particularly when a reaction is performed in a batch process. For example, during the batch process, a catalyst typically used in the polymerization may be deactivated, for example, due to long reaction time. Additionally, the batch processes may involve a lengthy catalyst induction period.

In one aspect, the present invention encompasses a recognition that a continuous manufacturing of polycarbonate polyol alleviates issues associated with catalyst deactivation in a batch process. For example, in certain embodiments, a continuous manufacturing can accommodate feeding a fresh catalyst continuously and/or periodically.

In certain embodiments, the present disclosed embodiments achieve one or more surprising features, for example, higher moisture tolerant level, reduced induction time, and/or decreased viscosity of prepared polycarbonate polyol (for example, by having increased molecular weight distribution).

In one aspect, the present disclosure provides a method of continuously producing a polycarbonate polyol. In some embodiments, the method includes: (i) feeding a solid catalyst into a continuous stirred tank reactor (CSTR) (for example, continuously, periodically); (ii) contacting a reaction mixture including one or more epoxides and carbon dioxide with the solid catalyst and a chain transfer agent including a plurality of sites capable of initiating copolymerization of epoxides and carbon dioxide in the CSTR; (iii) allowing polymerization reaction to proceed until a desired molecular weight polyol has formed; and (iv) terminating the polymerization reaction.

In another aspect, the present disclosure provides a method of continuously producing a polycarbonate polyol. In some embodiments, the method includes: (i) feeding a solid catalyst into a continuous stirred tank reactor (CSTR) (for example, continuously, periodically); (ii) contacting a reaction mixture including one or more epoxides and carbon dioxide with the solid catalyst and a chain transfer agent including a plurality of sites capable of initiating copolymerization of epoxides and carbon dioxide in the CSTR; and (iii) terminating the polymerization reaction once a desired molecular weight polyol has formed.

In some embodiments, a moisture tolerance level of the polymerization reaction is within a range from about 100 ppm to about 500 ppm. In some embodiments, a moisture tolerance level of the polymerization reaction is about 150 ppm. In some embodiments, a moisture level of the reaction mixture is below the moisture tolerance level of the polymerization reaction, and the method does not include drying the reaction mixture and/or the chain transfer agent prior to the polymerization reaction.

In some embodiments, there is no observable induction time of the solid catalyst subsequent to reactor startup.

In some embodiments, the solid catalyst is not activated prior to the feeding step. In some embodiments, the solid catalyst is activated prior to the feeding step.

In some embodiments, the solid catalyst includes a metal coordination compound including a permanent ligand set and at least one ligand that is a polymerization initiator.

In some embodiments, a polydispersity index of the polyol is within a range from about 1.2 to about 1.45.

In some embodiments, a viscosity of the polyol at 75 degrees C. is within a range from about 100 centipoise to about 10,000 centipoise.

In some embodiments, the method further includes adding the reaction mixture to the CSTR. In some embodiments, the one or more epoxides and the carbon dioxide are added separately. In some embodiments, the adding step(s) is continuous.

In some embodiments, the method further includes providing the chain transfer agent to the CSTR. In some embodiments, the providing step is continuous.

In some embodiments, the method further includes supplying a solvent to the CSTR. In some embodiments, the supplying step is continuous.

In some embodiments, the method further includes separating the solid catalyst after the terminating step. In some embodiments, the solid catalyst is removed via an ionic exchange resin.

In some embodiments, the method further includes discharging the polyol from the CSTR after the polymerization reaction. In some embodiments, the method further includes separating the polyol.

In some embodiments, a flow rate of the carbon dioxide is within a range from about 20 g/h to about 100 g/h. In some embodiments, a production rate of the polyol is within a range of about 200 g/h to about 1000 g/h.

In some embodiments, a number average molecular weight of the polyol is within a range of about 750 to about 1500 g/mol.

In some embodiments, a residence time of the reaction mixture is within a range of about 12 hours to about 24 hours.

In another aspect, the present disclosure provides polyol obtained by or obtainable by the method of any one of the preceding claims.

In another aspect, the present disclosure provides a system for producing a polyol. In some embodiments, the system includes: a CSTR in which polymerization reaction of the polyol proceeds; a solid catalyst input subsystem fluidly connected to the CSTR, wherein the solid catalyst are fed into the CSTR through the solid catalyst input subsystem; and a reagent input subsystem fluidly connected to the CSTR. In some embodiments, a reaction mixture includes one or more epoxides, and/or carbon dioxide, and a chain transfer agent including a plurality of sites capable of initiating copolymerization of epoxides and carbon dioxide are fed into the CSTR through the reagent input subsystem.

In some embodiments, the system further includes a quenching tank fluidly connected to the CSTR, in which a polymerization reaction of the polyol terminates.

In some embodiments, the system further includes a solid catalyst separation unit, in which the solid catalyst is separated, fluidly connected to the CSTR.

In some embodiments, the system further includes a polyol separation unit, in which the polyol is separated, fluidly connected to the CSTR.

In some embodiments, the CSTR includes a solvent including at least one of Methyl Acetate, Ethyl Acetate, Acetone, Methyl Ethyl Ketone, Propylene Oxide, Tetrahydrofuran, Monoglyme Triglyme, Propionitrile, 1-Nitropropane, Cyclohexanone, dibasic ester (DBE), tetrahydrofuran (THF), ether, dimethylformamide (DMF), and dimethyl sulfoxide (DMSO).

In some embodiments, the catalyst includes at least one of a cobalt-based salen catalyst, double metal cyanide (DMC), and a zinc-based catalyst.

In some embodiments, the chain transfer agent includes at least one of propylene glycol, dipropylene glycol, and/or polypropylene glycol.

In some embodiments, the polyol is discharged from the system at an interval in a range from about one second to about one hour.

In some embodiments, the solid catalyst is injected into the CSTR at an interval in a range from about one second to about one hour.

BRIEF DESCRIPTION OF THE DRAWINGS

A full and enabling disclosure of the present disclosed embodiments, including the best mode thereof, directed to one of ordinary skill in the art, is set forth in the specification, which makes reference to the appended Figures, in which.

DESCRIPTION OF CERTAIN EMBODIMENTS OF THE INVENTION

Figure 1:
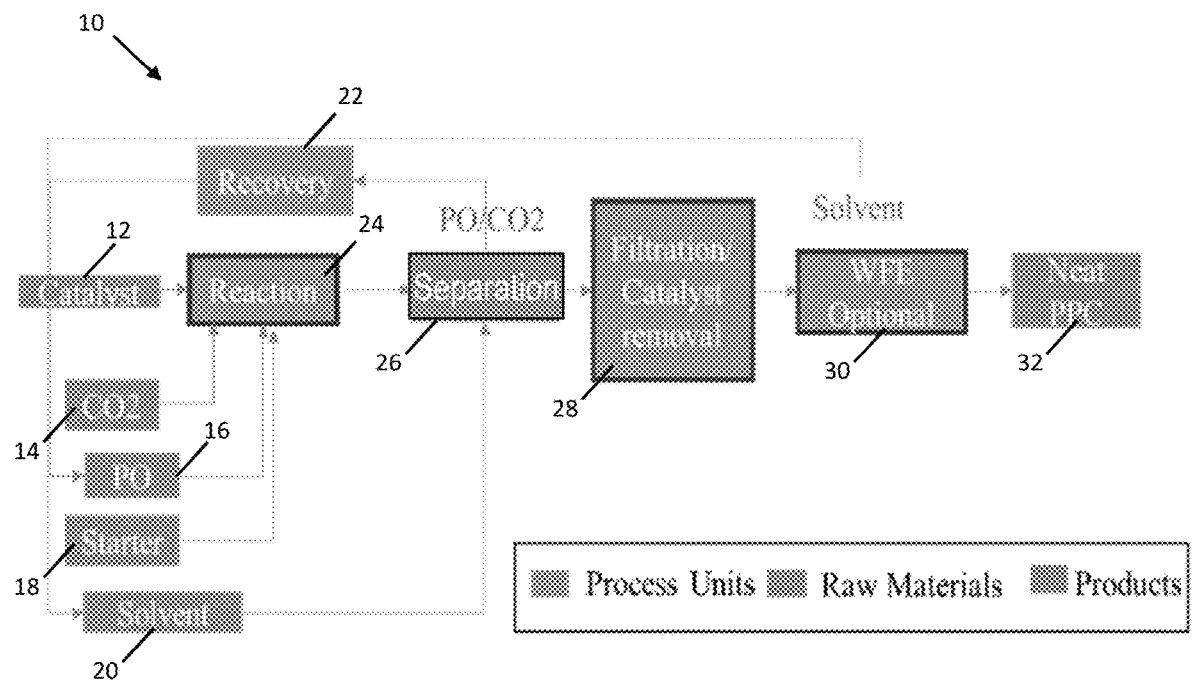
FIG. 1 illustrates an exemplary process to manufacture polyols, according to certain embodiments.

Reference will now be made in detail to the present disclosed embodiments, one or more examples of which are illustrated in the accompanying drawings. The detailed description uses numerical and/or letter designations to refer to features in the drawings. Like or similar designations in the drawings and description have been used to refer to like or similar parts of the present embodiments.

In accordance with one or more embodiments, the present disclosure provides technologies for synthesising polyol. Polyols, for example, polyether polyols, polyester polyols, and polycarbonate polyols, are reacted with diisocyanates in the production of polyurethanes. Traditionally, polyether polyols are prepared from ethylene oxide (EO) and/or propylene oxide (PO) in the presence of a strong base (for example, KOH).

Recently, the use of $CO_2$ to produce polycarbonate polyols has been encouraged by the rise in concerns regarding greenhouse gases and the carbon footprint. Polycarbonate polyols produced from $CO_2$ can reduce production cost, increase products' biocompatibility and biodegradability, and/or improve physical properties of the products. Such advantages allow for a wide range of applications of polycarbonate polyols, for example, in construction and biomedical purposes. For example, polycarbonate polyols produced from $CO_2$ are often used as raw materials for soft segments of polyurethanes and thermoplastic elastomers, used in paints, foams and adhesives, and/or used as high durability-imparting raw materials that require excellent in heat resistance, weather resistance and hydrolysis resistance. Polypropylene carbonate (PPC) polyols may be produced by the copolymerization of $CO_2$ with propylene oxide (PO) in the presence of an appropriate catalyst (for example, cobalt salen catalysts) and starter (i.e., chain transfer agent).

Synthesis of polyols is typically carried out using a batch process, where all the reagents are loaded in a batch reactor. However, a batch process is often challenging due to an inconsistency in the induction time, which can vary from a few minutes to hours. Additionally, a batch process produces polyols with high viscosity (for example, 5000-7000 cP at 75 degrees C.). Furthermore, a batch process is energy intensive due to the lengthy induction time (thus long reaction) and/or viscous products.

Methods

In certain embodiments, polyol may be synthesized via a continuous manufacturing process. In certain embodiments, provided continuous manufacturing processes include a continuous feeding of reagents, a continuous discharge of product mixtures, or a combination thereof. In certain embodiments, a continuous manufacturing process includes a periodic feeding of reagents. In certain embodiments, a continuous manufacturing process includes a periodic discharge of product mixtures.

In certain embodiments, a continuous manufacturing process is performed via a continuously stirred tank reactor (CSTR), a tubular reactor (for example, a plug flow reactor), a fixed bed reactor, a fluid bed reactor, a tubular reactor, or a combination thereof.

In certain embodiments, provided continuous manufacturing processes include a CSTR process. In certain embodiments, a continuous manufacturing process includes a continuous feed of reagents (for example, $CO_2$, EO/PO, starter) into a CSTR, and/or a continuous withdraw of products from a CSTR. In certain embodiments, reaction conditions and/or product specifications may be controlled by testing products withdrawn from a CSTR continuously or periodically (that is, intermittently). In some embodiments, a CSTR may facilitate rapid dilution of reagents through mixing. In some embodiments, a stirring speed is within a range of about 100 to about 1000 rpm, or about 300 to about 500 rpm.

In certain embodiments, a continuous manufacturing process includes feeding a solid catalyst into a reactor. In certain embodiments, feeding a solid catalyst is continuous, periodic, or a combination thereof.

In certain embodiments, a solid catalyst is not activated prior to feeding into a reactor. In certain embodiments, in a continuous manufacturing process, induction time of a solid catalyst is less than that of a batch process. In certain embodiments, an induction time of the solid catalyst is less than about one hour. In other embodiments, the induction time may be from about 15 minutes to about 10 hours. In other embodiments, the induction time may be from about 15 minutes to about 5 hours. In other embodiments, the induction time may be from about 1 hour to about 5 hours. In other embodiments, the induction time may be from about 2 hour to about 5 hours. In other embodiments, the induction time may be from about 2 hour to about 4 hours. In other embodiments, the induction time may be about 3 hours. In some embodiments of provided continuous manufacturing processes, continuous addition of a solid catalyst avoids any effective catalyst induction time in the reactor since existing (i.e., prior added) active catalyst performs the polymerization while a newly added portion of catalyst is undergoing activation. In certain embodiments, in a continuous manufacturing process, induction time of a solid catalyst only occurs when starting up. For example, in some embodiments, a continuous manufacturing process has no induction time (for example, during a resident time of 24 hours) after starting up. In other embodiments, the induction time is approximately equal to the time it takes the moisture of the reactants to be consumed by the propylene oxide (PO), plus or minus about 20%. In other embodiments, the induction time is approximately equal to the time it takes the moisture of the reactants to be consumed by the propylene oxide (PO), plus or minus about 10%. In some aspects of the present embodiments, p-toluenesufonic acid (PTSA) may be used to catalyze the reaction between the moisture that is present and the propylene oxide (PO), thereby quickly reducing the moisture level and in turn, the induction time. In some embodiments, PTSA may be dissolved in a starter such as di-propylene glycol (DPG). However, using the CSTR process, PTSA may not be needed in some embodiments. In embodiments that employ PTSA, the catalyst may be injected directly into the reactor separately from both the starter (for example, DPG).

In certain embodiments, a continuous manufacturing process in accordance with the present disclosure includes contacting a reaction mixture with the solid catalyst and a chain transfer agent in a reactor. In certain embodiments, a residence time of a reaction mixture is within a range of about 12 hours to about 24 hours. In certain embodiments, a reaction time is between about 30 minutes and 48 hours. In some embodiments, a reaction is allowed to process for less than 24 hours. In some embodiments, a reaction is allowed to progress for less than 12 hours. In some embodiments, a reaction is allowed to process from about 4 to about 12 hours.

In certain embodiments, a reaction is conducted at a temperature range of about 0° C. to about 150° C. In certain embodiments, a reaction is conducted at a temperature range of about 23° C. to about 100° C. In certain embodiments, a reaction is conducted at a temperature range of about 23° C. to about 80° C. In certain embodiments, a reaction is conducted at a temperature range of about 23° C. to about 50° C.

In certain embodiments, a pressure in a reactor is within a range of about 30 psi to about 800 psi. In certain embodiments, a pressure in a reactor is within a range of about 30 psi to about 500 psi. In certain embodiments, a pressure in a reactor is within a range of about 30 psi to about 400 psi. In certain embodiments, a pressure in a reactor is within a range of 30 psi to about 300 psi. In certain embodiments, a pressure in a reactor is within a range of about 30 psi to about 200 psi. In certain embodiments, a pressure in a reactor is within a range of about 30 psi to about 100 psi. In certain embodiments, a pressure in a reactor is within a range of about 30 psi to about 80 psi. In certain embodiments, a pressure in a reactor is about 30 psi. In certain embodiments, a pressure in a reactor is about 50 psi, or from about 40 psi to about 60 psi. In certain embodiments, a pressure in a reactor is about 100 psi, or from about 80 psi to about 120 psi. In certain embodiments, $CO_2$ is supercritical in a reactor.

In certain embodiments, provided continuous manufacturing processes include allowing a polymerization reaction to proceed until a desired molecular weight polyol has formed. In certain embodiments, a continuous manufacturing process includes terminating the polymerization reaction. In some embodiments, a polymerization reaction is terminated by adding a terminating agent (for example, methanol with $H_3PO_4$). In some embodiments, a polymerization reaction is terminated by removing a catalyst (for example, via ionic exchange resin)

In some embodiments, a desired molecular weight of polyols from the continuous manufacturing processes of the present disclosed embodiments is a number average molecular weight ranging from about 400 to about 400,000 g/mol. In some embodiments, a desired molecular weight of polyols is a number average molecular weight ranging from about 400 to about 20,000 g/mol. In some embodiments, a desired molecular weight of polyols is a number average molecular weight ranging from about 500 to about 5,000 g/mol. In other embodiments, a desired molecular weight of polyols is a number average molecular weight ranging from about 800 to about 4,000 g/mol. In some embodiments, a desired molecular weight of polyols is a number average molecular weight ranging from about 1,000 to about 3,000 g/mol. In some embodiments, a desired molecular weight of polyols is a number average molecular weight of about 1,000 g/mol, or from about 800 g/mol to about 1,200 g/mol. In some embodiments, a desired molecular weight of polyols is a number average molecular weight of about 2,000 g/mol, or from about 1,600 g/mol to about 2,400 g/mol. In some embodiments, a desired molecular weight of polyols is a number average molecular weight of about 3,000 g/mol, or from about 2,500 g/mol to about 3,500 g/mol.

In certain embodiments, the present disclosed continuous manufacturing processes include sampling a reaction and determining a molecular weight of polyols at a given time. In certain embodiments, sampling and molecular weight determination are performed at two or more time intervals. In certain embodiments, the sampling is obtained from a continuous withdrawal of a composition from a reactor. In certain embodiments, a plot of molecular weight gain over time is constructed and the method further includes the step of determining from this plot the time at which desired molecular weight polyols will be present. In certain embodiments, the time at which the polymerization is ended is determined by this method. In conventional batch processes, the resident time of various reactants (or polymerization time) is similar and leads to relatively homogeneous molecular weight distribution (MWD). By contrast, with the CSTR process of the present embodiments, reactants are fed continuously and the product is withdrawn continuously. As a result, some polymers with longer resident times lead to high molecular weights while polymers with short resident times lead to lower molecular weight, thereby leading to wider product MWD (for example, higher polydispersity index) with the CSTR process of the present embodiments compared to conventional batch processes. In some embodiments, polypropylene carbonate (PPC) polyols produced by CSTR according to the present embodiments exhibit a wide MWD which advantageously lowers the viscosity of the product. As such, the CSTR process of the present embodiments may be utilized as an efficient tool to reduce the viscosity of the PPC polyol.

In certain embodiments, a polymerization reaction proceeds until between about 20% and about 100% of the provided epoxide is consumed. In certain embodiments, a conversion is from about 40% and about 90% (that is, 40% to 90% of the epoxide is consumed). In certain embodiments, a conversion is at least 50%. In other embodiments, a conversion is at least 60%, at least 80% or at least 85%. In certain embodiments, at least 90% of the provided epoxide is converted to polycarbonate polyol.

In certain embodiments, a continuous manufacturing process includes a recycling step. In certain embodiments, $CO_2$ may be recycled. In certain embodiments, epoxide may be recycled.

In certain embodiments, a continuous manufacturing process includes adding a reaction mixture to a reactor. In certain embodiments, a continuous manufacturing process includes adding a chain transfer agent to a reactor. In certain embodiments, a continuous manufacturing process includes adding a solvent a reactor. In certain embodiments, one or more adding steps are continuous. In certain embodiments, one or more adding steps are periodic (or intermittent). In certain embodiments, two or more adding steps are combined (for example, adding two or more compositions concurrently).

In certain embodiments, a continuous manufacturing process includes separating a solid catalyst after terminating a reaction. In certain embodiments, a solid catalyst is removed via an ionic exchange resin or filtration.

In certain embodiments, a continuous manufacturing process includes discharging polyols from a reactor after a polymerization reaction. In certain embodiments, a continuous manufacturing process includes separating a desired polyol population from a discharged composition from a reactor.

In certain embodiments, provided continuous manufacturing processes have a higher moisture content tolerance than a corresponding batch process. Many batch processes require that all chemicals are at less than 100 parts per million (ppm) moisture levels. CSTR processes according to certain present embodiments feed a small portion of fresh starting material such as PO, $CO_2$, and/or starter material into a bulk of reactants and products. For example, in CSTR process according to certain present embodiments, a total feed rate of ~50 g per minute is used for a reactor containing 2000 g of product and unreacted reactants. Even if the reactants contain 1000 ppm moisture, the total moisture level of the reactor is 25 ppm (that is, 50*1000 ppm/2000) which is much less than moisture limit of 100 ppm. In other words, using the CSTR processing of the present embodiments, higher moisture levels in the reactants may be accommodated by controlling the continuous feed rate of reactants into the reactor.

In certain embodiments, a moisture tolerance level is within a range from about 100 ppm to about 500 ppm. In certain embodiments, a moisture tolerance level is within a range from about 100 ppm to about 400 ppm. In certain embodiments, a moisture tolerance level is within a range from about 100 ppm to about 300 ppm. In certain embodiments, a moisture tolerance level is within a range from about 100 ppm to about 200 ppm. In certain embodiments, a moisture tolerance level is about 150 ppm, or from about 125 ppm to about 175 ppm. For example, a continuous manufacturing process allows a high degree of freedom in terms of moisture content due to the increased moisture tolerance level of 150 ppm for a successful polymerization reaction.

In certain embodiments, a continuous manufacturing process does not require drying the reaction mixture and/or the chain transfer agent prior to the polymerization reaction. In certain embodiments, a continuous manufacturing process includes drying the reaction mixture and/or the chain transfer agent prior to the polymerization reaction. In such embodiments, drying in a continuous manufacturing process is shorter and/or less than one in a batch process.

In certain embodiments, a flow rate of the carbon dioxide is within a range from about 10 g/h to about 100 g/h. In certain embodiments, a flow rate of the carbon dioxide is within a range from about 20 g/h to about 100 g/h. In certain embodiments, a flow rate of the carbon dioxide is within a range from about 30 g/h to about 100 g/h. In certain embodiments, a flow rate of the carbon dioxide is within a range from about 40 g/h to about 100 g/h. In certain embodiments, a flow rate of the carbon dioxide is within a range from about 50 g/h to about 100 g/h. In certain embodiments, a flow rate of the carbon dioxide is within a range from about 10 g/h to about 90 g/h. In certain embodiments, a flow rate of the carbon dioxide is within a range from about 10 g/h to about 80 g/h. In certain embodiments, a flow rate of the carbon dioxide is within a range from about 10 g/h to about 70 g/h. In certain embodiments, a flow rate of the carbon dioxide is within a range from about 20 g/h to about 70 g/h. In certain embodiments, a flow rate of the carbon dioxide is within a range from about 30 g/h to about 70 g/h. In certain embodiments, a flow rate of the carbon dioxide is within a range from about 40 g/h to about 70 g/h. In certain embodiments, a flow rate of the carbon dioxide is within a range from about 50 g/h to about 70 g/h.

In certain embodiments, a production rate of a polyol synthesized by a continuous manufacturing process is within a range of about 100 g/h to about 1000 g/h. In certain embodiments, a production rate of a polyol synthesized by a continuous manufacturing process is within a range of about 200 g/h to about 1000 g/h. In certain embodiments, a production rate of a polyol synthesized by a continuous manufacturing process is within a range of about 300 g/h to about 1000 g/h. In certain embodiments, a production rate of a polyol synthesized by a continuous manufacturing process is within a range of about 200 g/h to about 900 g/h. In certain embodiments, a production rate of a polyol synthesized by a continuous manufacturing process is within a range of about 200 g/h to about 800 g/h. In certain embodiments, a production rate of a polyol synthesized by a continuous manufacturing process is within a range of about 200 g/h to about 700 g/h. In certain embodiments, a production rate of a polyol synthesized by a continuous manufacturing process is within a range of about 300 g/h to about 900 g/h. In certain embodiments, a production rate of a polyol synthesized by a continuous manufacturing process is within a range of about 300 g/h to about 800 g/h. In certain embodiments, a production rate of a polyol synthesized by a continuous manufacturing process is within a range of about 300 g/h to about 700 g/h. In certain embodiments, a production rate of a polyol synthesized by a continuous manufacturing process is within a range of about 300 g/h to about 600 g/h. In certain embodiments, a production rate of a polyol synthesized by a continuous manufacturing process is within a range of about 300 g/h to about 500 g/h.

Compositions

In some embodiments, polyols in accordance with the present disclosure (for example, synthesized by a continuous manufacturing process) have a higher polydispersity index than polyols generated by a batch process (for example, polydispersity index of about 1.1). In certain embodiments, a polydispersity index of a polyol synthesized by a continuous manufacturing process is within a range from about 1.2 to about 2. In certain embodiments, a polydispersity index of a polyol synthesized by a continuous manufacturing process is within a range from about 1.2 to about 1.9. In certain embodiments, a polydispersity index of a polyol synthesized by a continuous manufacturing process is within a range from about 1.2 to about 1.8. In certain embodiments, a polydispersity index of a polyol synthesized by a continuous manufacturing process is within a range from about 1.2 to about 1.7. In certain embodiments, a polydispersity index of a polyol synthesized by a continuous manufacturing process is within a range from about 1.2 to about 1.6. In certain embodiments, a polydispersity index of a polyol synthesized by a continuous manufacturing process is within a range from about 1.2 to about 1.5. In certain embodiments, a polydispersity index may be measured by Gel Permeation Chromatography (GPC) analysis.

Without wishing to be bound by any particular theory, it is contemplated that polyols with an increased polydispersity index have a decreased viscosity. For example, in some embodiments, polyols manufactured by the provided continuous manufacturing processes have a higher polydispersity index and a lower viscosity than polyols produced by a batch process. In some embodiments, lowering a viscosity of polyols is advantageous, because downstream processing of such polyols may be improved. In some embodiments, the present disclosed embodiments may produce polyols with a viscosity in a range from about 100 centipoise to about 10,000 centipoise, or from about 1,000 centipoise to about 7,000 centipoise, or from about 300 centipoise to about 3.00 centipoise, as 75 degrees C.

In certain embodiments, a viscosity may be measured by an oscillatory rheometer (for example, according to ASTM D7175, ASTM D7483). In certain embodiments, steady shear rheological characteristics may be investigated with a controlled stress rotational rheometer (for example, AR1500ex (TA Instruments, New Castle, DE, USA)). In certain embodiments, a Peltier plate and cover may be used to maintain a measuring temperature (for example, 75 degrees C.) while acquiring flow curves. For example, viscosity measurements may be carried out with a plate and cone fixture (for example, with 20 mm diameter and 1° cone angle, using a gap of 22 μm which is the cone truncation height).

In certain embodiments, polyols in accordance with the present disclosure have a number average molecular weight of a polyol synthesized by a continuous manufacturing process within a range of about 400 to about 400,000 g/mol. In certain embodiments, polyols in accordance with the present disclosure have a number average molecular weight of a polyol synthesized by a continuous manufacturing process within a range of about 400 to about 200,000 g/mol. In certain embodiments, polyols in accordance with the present disclosure have a number average molecular weight of a polyol synthesized by a continuous manufacturing process within a range of about 500 to about 5,000 g/mol. In certain embodiments, polyols in accordance with the present disclosure have a number average molecular weight of a polyol synthesized by a continuous manufacturing process within a range of about 750 to about 4,000 g/mol. In certain embodiments, polyols in accordance with the present disclosure have a number average molecular weight of a polyol synthesized by a continuous manufacturing process within a range of about 750 to about 3,000 g/mol. In certain embodiments, polyols in accordance with the present disclosure have a number average molecular weight of a polyol synthesized by a continuous manufacturing process within a range of about 750 to about 2,000 g/mol. In certain embodiments, polyols in accordance with the present disclosure have a number average molecular weight of a polyol synthesized by a continuous manufacturing process within a range of about 750 to about 1,500 g/mol.

In certain embodiments, reaction mixtures include one or more epoxides selected from the group consisting of:

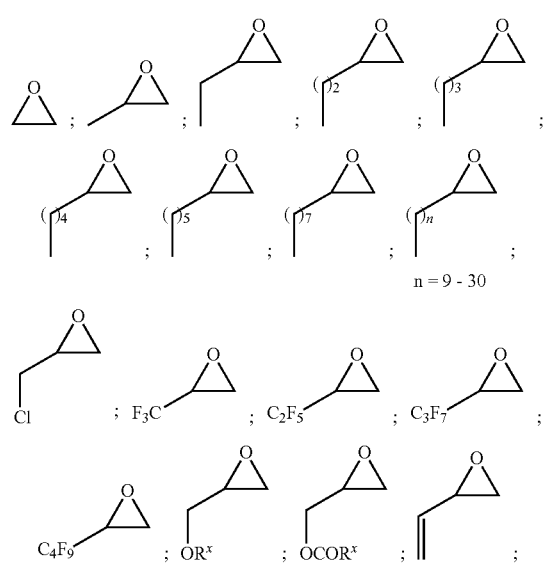

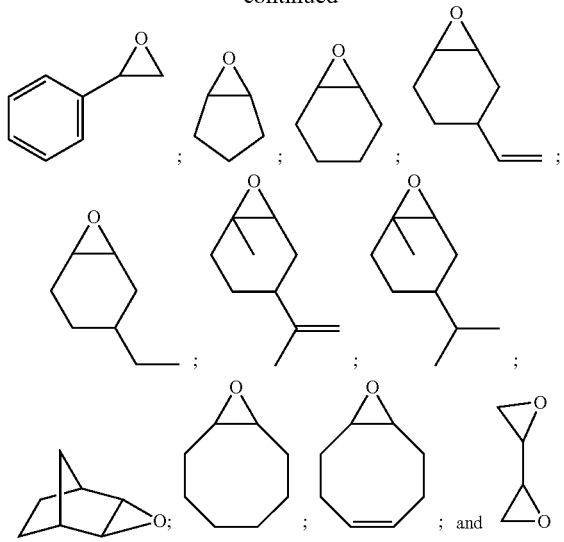

wherein each $R^x$ is, independently, selected from optionally substituted aliphatic, optionally substituted heteroaliphatic, optionally substituted aryl and optionally substituted heteroaryl. In some embodiments, a phenyl group of an epoxide may be substituted with $R^x$ selected from optionally substituted aliphatic, optionally substituted heteroaliphatic, optionally substituted aryl and optionally substituted heteroaryl.

In certain embodiments, reaction mixtures include ethylene oxide. In other embodiments, reaction mixtures include propylene oxide (PO). In other embodiments, reaction mixtures include cyclohexene oxide. In other embodiments, reaction mixtures include epichlorohydrin. In certain embodiments, reaction mixtures include a glycidyl ether or glycidyl ester. In certain embodiments, reaction mixtures include phenyl glycidyl ether. In certain embodiments, reaction mixtures include t-butyl glycidyl ether.

In certain embodiments, reaction mixtures include ethylene oxide and propylene oxide. In certain embodiments, reaction mixtures include propylene oxide along with from about 0.1 to about 10% of a $C_4$-$C_{30}$ epoxide. In certain embodiments, reaction mixtures include propylene oxide along with from about 0.1 to about 10% of a glycidyl ether. In certain embodiments, reaction mixtures include propylene oxide along with from about 0.1 to about 10% of a glycidyl ester. In certain embodiments, reaction mixtures include ethylene oxide along with from about 0.1 to about 10% of a glycidyl ether. In certain embodiments, reaction mixtures include ethylene oxide along with from about 0.1 to about 10% of a glycidyl ester. In certain embodiments, reaction mixtures include ethylene oxide along with from about 0.1 to about 10% of a $C_4$-$C_{30}$ epoxide.

In certain embodiments, reaction mixtures include epoxides derived from naturally occurring materials such as epoxidized resins or oils. Examples of such epoxides include, but are not limited to: Epoxidized Soybean Oil; Epoxidized Linseed Oil; Epoxidized Octyl Soyate; Epoxidized PGDO; Methyl Epoxy Soyate; Butyl Epoxy Soyate; Epoxidized Octyl Soyate; Methyl Epoxy Linseedate; Butyl Epoxy Linseedate; and Octyl Epoxy Linseedate. These and similar materials are available commercially from Arkema Inc. under the trade name Vikoflex®. Examples of such commerically available Vikoflex® materials include Vikoflex 7170 Epoxidized Soybean Oil, Vikoflex 7190 Epoxidized Linseed, Vikoflex 4050 Epoxidized Octyl Soyate, Vikoflex 5075 Epoxidized PGDO, Vikoflex 7010 Methyl Epoxy Soyate, Vikoflex 7040 Butyl Epoxy Soyate, Vikoflex 7080 Epoxidized Octyl Soyate, Vikoflex 9010 Methyl Epoxy Linseedate, Vikoflex 9040 Butyl Epoxy Linseedate, and Vikoflex 9080 Octyl Epoxy Linseedate. In certain embodiments, the polycarbonate polyols of the present invention incorporate epoxidized fatty acids.

In certain embodiments, a chain transfer agent includes a plurality of sites capable of initiating copolymerization of epoxides and carbon dioxide in a reactor. It will be appreciated that the terms "starter" and "chain transfer agent" are used interchangeably in the present disclosure. In some embodiments, a chain transfer agent includes one or more polyhydric alcohols. In certain embodiments, a polyhydric alcohol is a diol. In certain embodiments, diols include but are not limited to: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, and 1,4-cyclohexanediethanol.

Other examples include the polyalkylene glycols such as: diethylene glycol, triethylene glycol, tetraethylene glycol, higher poly(ethylene glycol), such as those having number average molecular weights of from about 220 to about 2000 g/mol, glycerol, erythritol, xylitol, dipropylene glycol, tripropylene glycol, and higher poly(propylene glycol) such as those having number average molecular weights of from about 234 to about 2000 g/mol (for example, about 1000 g/mol). In some embodiments, a chain transfer agent may include propylene glycol, dipropylene glycol, and/or polypropylene glycol.

In certain embodiments, diol chain transfer agents include hydroxyl-terminated polyolefins. Such materials include polymers sold by Sartomer Inc. under the trade name Krasol®. In other embodiments, diol chain transfer agents can include hydroxyl-terminated polyisobutylenes (PIB-diols and -triols) such as Polytail® H or Polytail®HA from Mitsubish Chemical Co. Other examples include hydroxyl-terminated polybutadienelstyrene (HTBS).

Yet other examples of suitable diols that may be provided in step (a) include 4,4'-(1-methylethylidene) bis[cyclohexanol], 2,2'-methylenebis[phenol], 4,4'-methylenebis[phenol], 4,4'-(phenylmethylene)bis[phenol], 4,4'-(diphenylmethylene)bis[phenol], 4,4'-(1,2-ethanediyl)bis[phenol], 4,4'-(1,2-cyclohexanediyl)bis[phenol], 4,4'-(1,3-cyclohexanediyl)bis[phenol], 4,4'-(1,4-cyclohexanediyl)bis[phenol], 4,4'-ethylidenebis[phenol], 4,4'-(1-phenylethylidene)bis[phenol], 4,4'-propylidenebis[phenol], 4,4'-cyclohexylidenebis [phenol], 4,4'-(1-methylethylidene)bis [phenol], 4,4'-(1-methylpropylidene)bis[phenol], 4,4'-(1-ethylpropylidene)bis[phenol], 4,4'-cyclohexylidenebis [phenol], 4,4'-(2,4,8,10-tetraoxaspiro[5.5]undecane-3,9-diyldi-2,1-ethanediyl)bis[phenol], 1,2-benzenedimethanol, 1,3-benzenedimethanol, 1,4-benzenedimethanol, 4,4'-[1,3-phenylenebis(1-methylethylidene)]bis[phenol], 4,4'-[1,4-phenylenebis(1-methylethylidene)]bis[phenol], phenolphthalein, 4,4'-(1-methylidene)bis[2-methylphenol], 4,4'-(1-methylethylidene)bis[2-(1-methylethyl)phenol], 2,2'-methylenebis[4-methyl-6(1-methylethyl)phenol], In certain embodiments, a chain transfer agent is a polyhydric phenol derivative. In certain embodiments, a polymerization initiator is selected from the group consisting of:

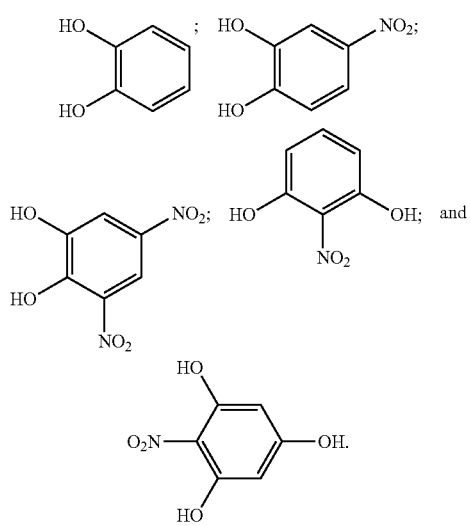

In some embodiments, a polyhydric alcohol provided as a chain transfer agent is a triol, a tetraol or a higher polyol. Suitable triols may include, but are not limited to: aliphatic triols having a molecular weight less than 500 such as trimethylolethane; trimethylolpropane; glycerol; 1,2,4-butanetriol; 1,2,6-hexanetriol; tris(2-hydroxyethyl)isocyanurate; hexahydro-1,3,5-tris(hydroxyethyl)-s-triazine; 6-methyl-heptane-1,3,5-triol; polypropylene oxide triol; and polyester triols.

In certain embodiments, a chain transfer agent includes a hydroxy acid. In certain embodiments, a chain transfer agent includes a diacid. In certain embodiments, a chain transfer agent includes a compound selected from the group consisting of:

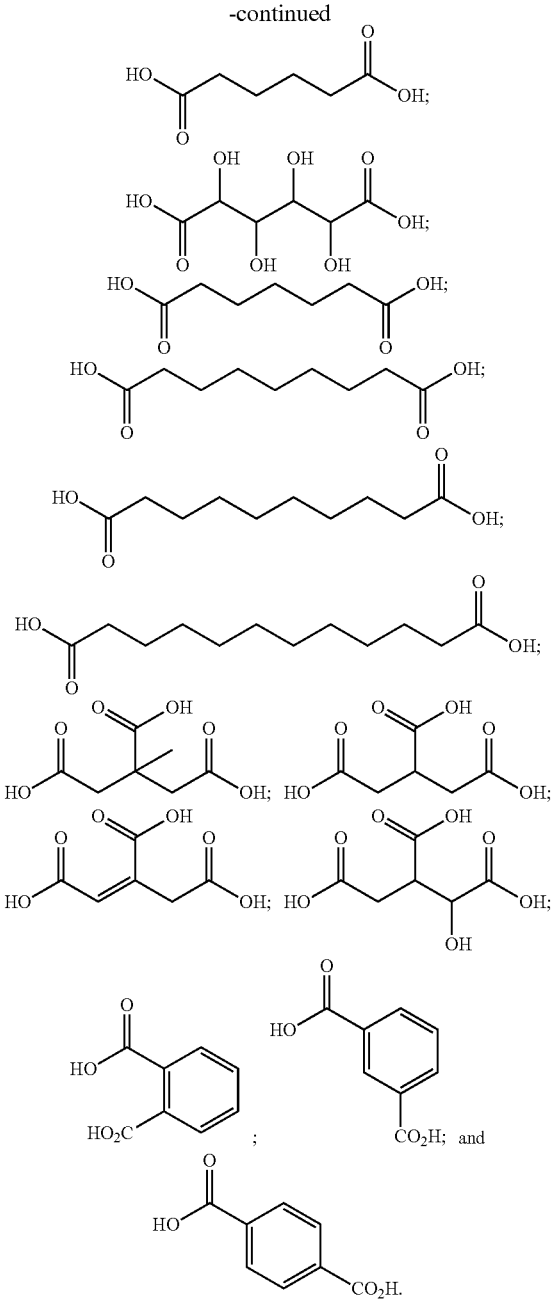

In certain embodiments, diacid chain transfer agents include carboxy terminated polyolefin polymers. In certain embodiments, carboxy terminated polyolefins include materials such as NISSO-PB C-series resins produced by Nippon Soda Co. Ltd.

In certain embodiments, a provided chain transfer agent is a hydroxy acid. In certain embodiments, a hydroxy acid is selected from the group consisting of:

-continued

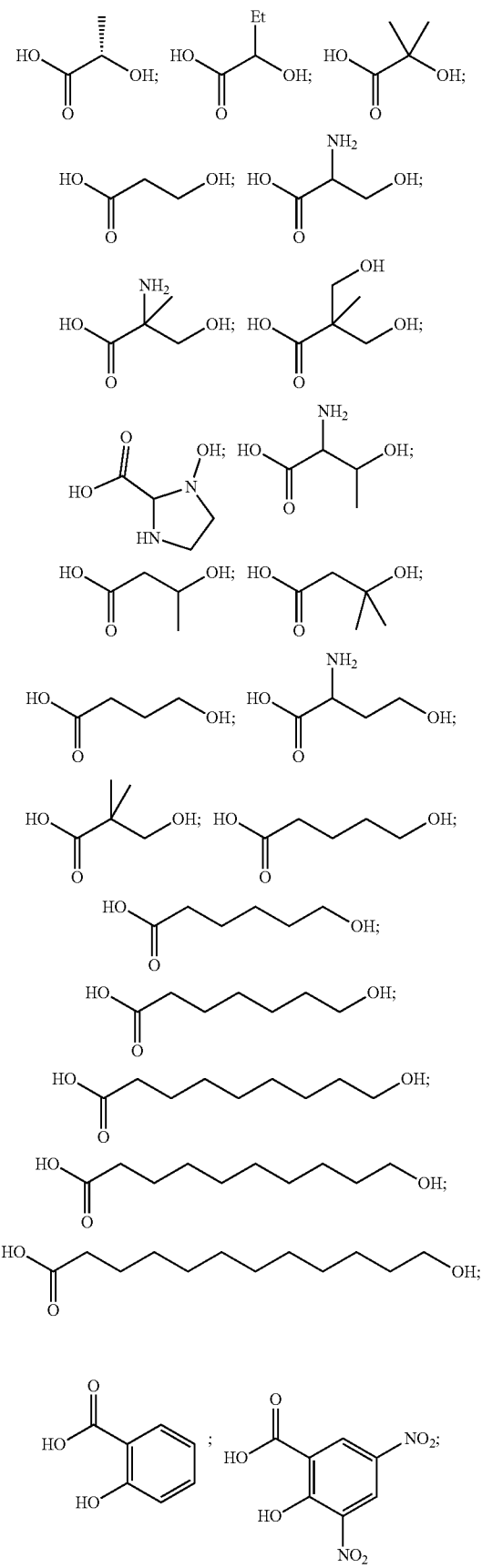

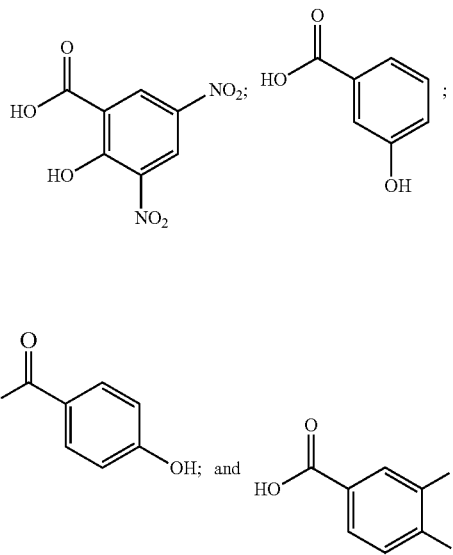

In certain embodiments where the provided chain transfer agent includes an acidic functional group, the compound is provided as a salt. In certain embodiments a carboxylic chain transfer agent is provided as an ammonium salt.

In some embodiments, a solid catalyst may include cobalt-based catalysts as well as double metal cyanide (DMC) catalysts and/or zinc-based catalysts. In some embodiments, a solid catalyst is a catalyst described in WO2010/022388, WO2012/037282, WO2013/022932, WO2013/012895, WO2013/096602, and WO2014/031811, the entire contents of each of which are hereby incorporated by reference.

In certain embodiments, a solid catalyst comprises a metal coordination compound comprising a permanent ligand set and at least one ligand that is a polymerization initiator. In certain embodiments, a solid catalyst has the formula $L_p$-M-$(L_I)_m$, where $L_p$ is a permanent ligand set, M is a metal atom, and $L_I$ is a ligand that is a polymerization initiator, and m is an integer from 0 to 2, inclusive representing the number of initiating ligands present. In some embodiments, a polymerization initiator $L_I$ is selected from the group consisting of: azide, halides, alkyl sulfonates, carboxylates, alkoxides, and phenolates.

In some embodiments, a solid catalyst is a metallosalenate catalyst. In certain embodiments, a solid catalyst has a structure selected from the group consisting of:

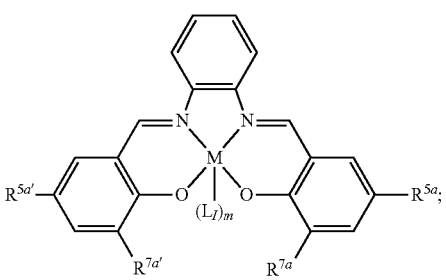

-continued

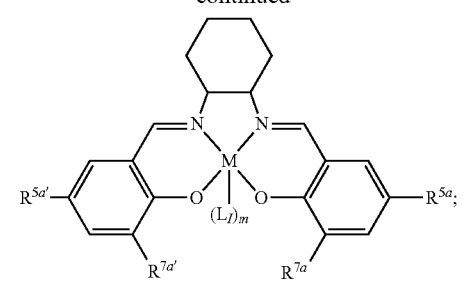

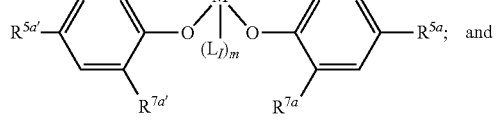

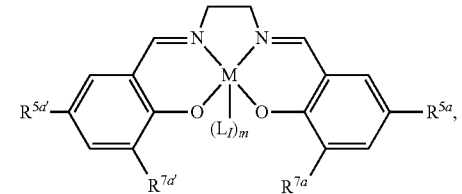

wherein
$R^{5a}$, $R^{5a'}$, $R^{7a}$, and $R^{7a'}$ are each independently hydrogen, halogen, or a group selected from $C_{1-20}$ aliphatic or $C_{1-20}$ heteroaliphatic, wherein the aliphatic or heteroaliphatic group may be substituted with one or more of halogen, oxo, amidine, amidinium, guanidine, or guanidinium.

In certain embodiments, each pair of substituents on the salicaldehyde portions of the complexes above are the same (i.e. $R^{5a}$ & $R^{5a'}$ are the same and $R^{7a}$ & $R^{7a'}$ are the same). In other embodiments, at least one of $R^{5a}$ & $R^{5a'}$ or $R^{7a}$ & $R^{7a}$ are different from one another.

In some embodiments, a solid catalyst has a structure $L_p\text{-M-}(L_I)_m$, where $L_p\text{-M}$ is selected from the group consisting of:

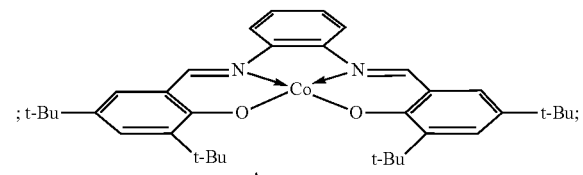

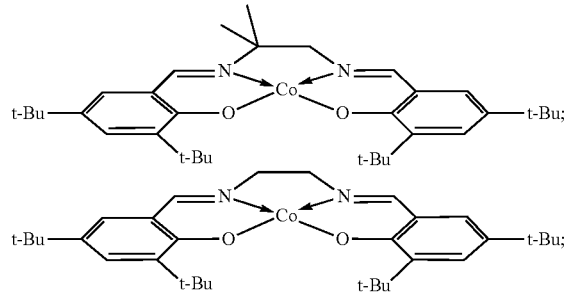

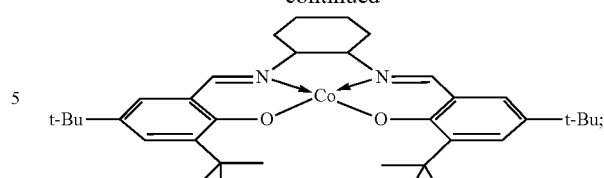

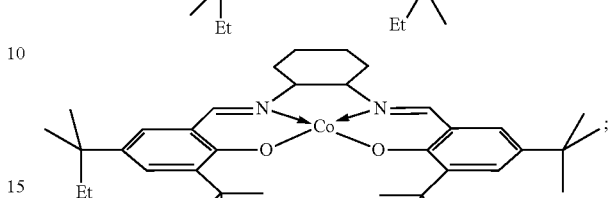

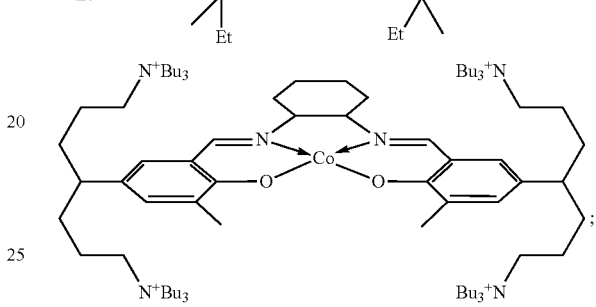

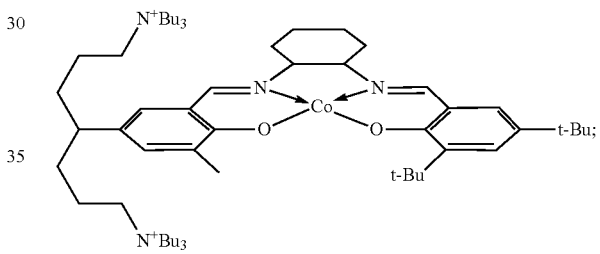

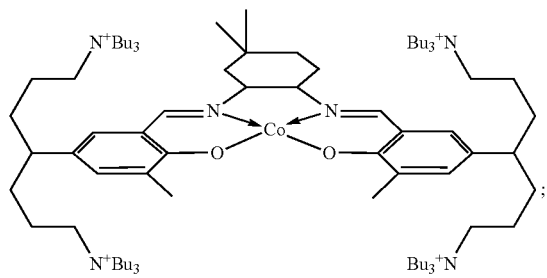

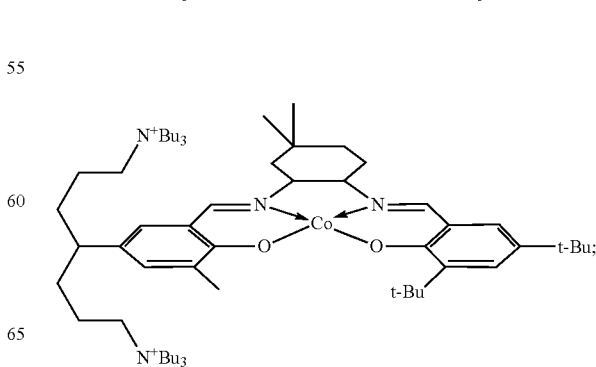

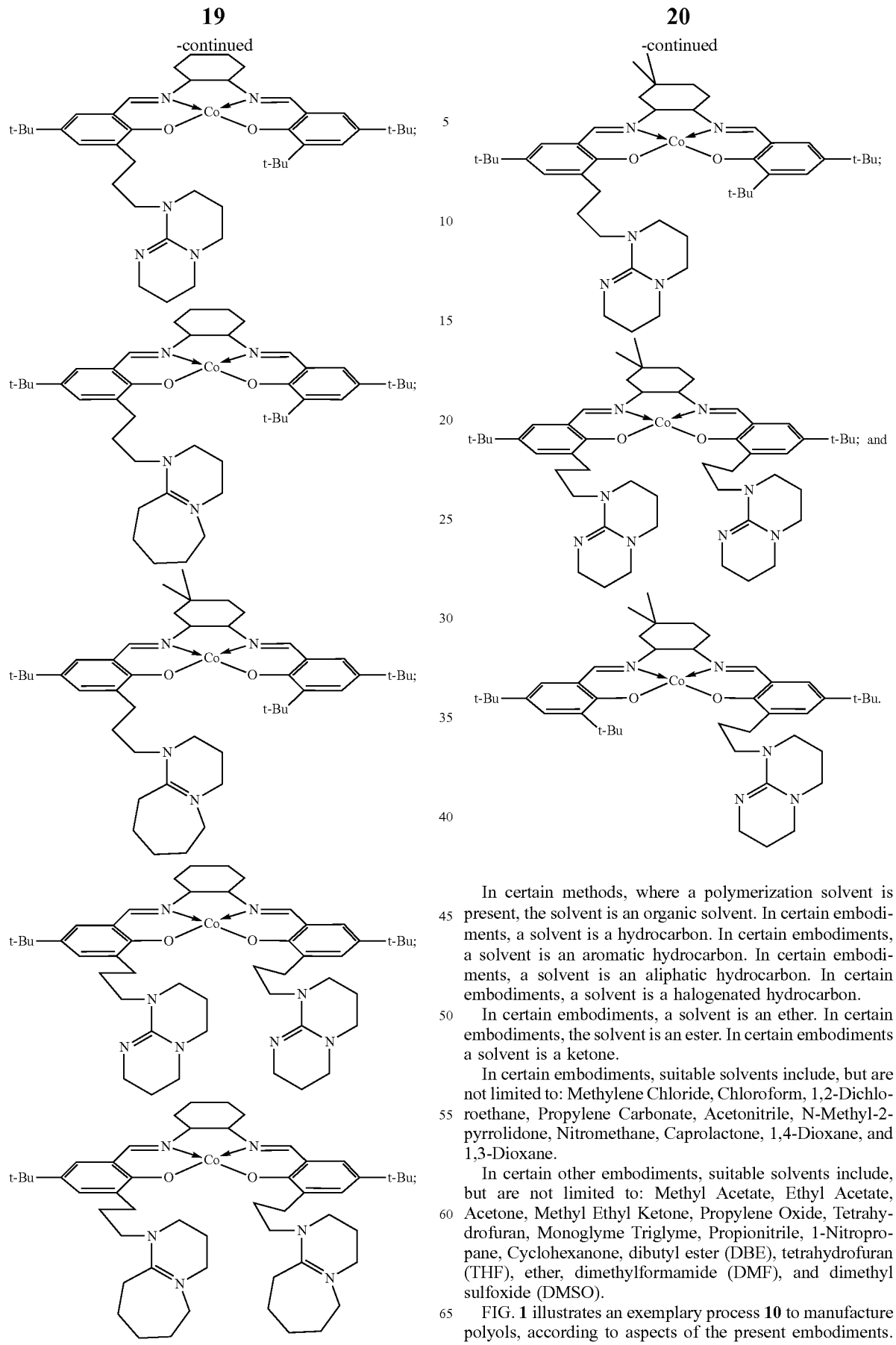

In certain methods, where a polymerization solvent is present, the solvent is an organic solvent. In certain embodiments, a solvent is a hydrocarbon. In certain embodiments, a solvent is an aromatic hydrocarbon. In certain embodiments, a solvent is an aliphatic hydrocarbon. In certain embodiments, a solvent is a halogenated hydrocarbon.

In certain embodiments, a solvent is an ether. In certain embodiments, the solvent is an ester. In certain embodiments a solvent is a ketone.

In certain embodiments, suitable solvents include, but are not limited to: Methylene Chloride, Chloroform, 1,2-Dichloroethane, Propylene Carbonate, Acetonitrile, N-Methyl-2-pyrrolidone, Nitromethane, Caprolactone, 1,4-Dioxane, and 1,3-Dioxane.

In certain other embodiments, suitable solvents include, but are not limited to: Methyl Acetate, Ethyl Acetate, Acetone, Methyl Ethyl Ketone, Propylene Oxide, Tetrahydrofuran, Monoglyme Triglyme, Propionitrile, 1-Nitropropane, Cyclohexanone, dibutyl ester (DBE), tetrahydrofuran (THF), ether, dimethylformamide (DMF), and dimethyl sulfoxide (DMSO).

FIG. 1 illustrates an exemplary process 10 to manufacture polyols, according to aspects of the present embodiments. The process 10 may include several raw material inputs such as catalyst, $CO_2$, PO, starter, and/or solvent. At step 12, the process 10 may include adding catalyst to the reaction 24. At step 14, the process 10 may include adding $CO_2$ to the reaction 24. At step 16, the process 10 may include adding propylene oxide (PO) to the reaction 24. At step 18, the process 10 may include adding starter to the reaction 24. As described herein, steps 12, 14, 16, and 18 may occur in various orders. For example, step 12 does not need to precede step 14, which does not need to precede step 16, which does not need to precede step 18, according to aspects of the present embodiments.

Referring still to FIG. 1, downstream of and/or subsequent to the reaction 24, the process 10 may include separating 26 the propylene oxide (PO) 16 from $CO_2$ 14 such that the propylene oxide (PO) 16 may be recovered 22 such that it may be reacted again. Solvent 20 may also be introduced during the separation process 26. Downstream of and/or subsequent to the separation 26 of the propylene oxide (PO) 16 from the $CO_2$ 14, the process 10 may include a filtration and/or catalyst removal process 28. Downstream of and/or subsequent to the filtration and/or catalyst removal process 28, the process 10 may include passing the reactants through a wiper film evaporator 30. In some embodiments, passing the reactants through a wiper film evaporator 30 (WFE) may be omitted. In embodiments that include the wiper film evaporator 30, solvent 20 may be extracted from the wiper film evaporator 30 such that it may be reused in the separation 26 of the propylene oxide (PO) 16 from the $CO_2$ 14. Downstream of and/or subsequent to the wiper film evaporator 30 (or optionally downstream of the filtration and catalyst removal 28 in embodiments that do not include a wiper film evaporator 30) the process may include outputting the PPC polyol product 32.

Figure 2:
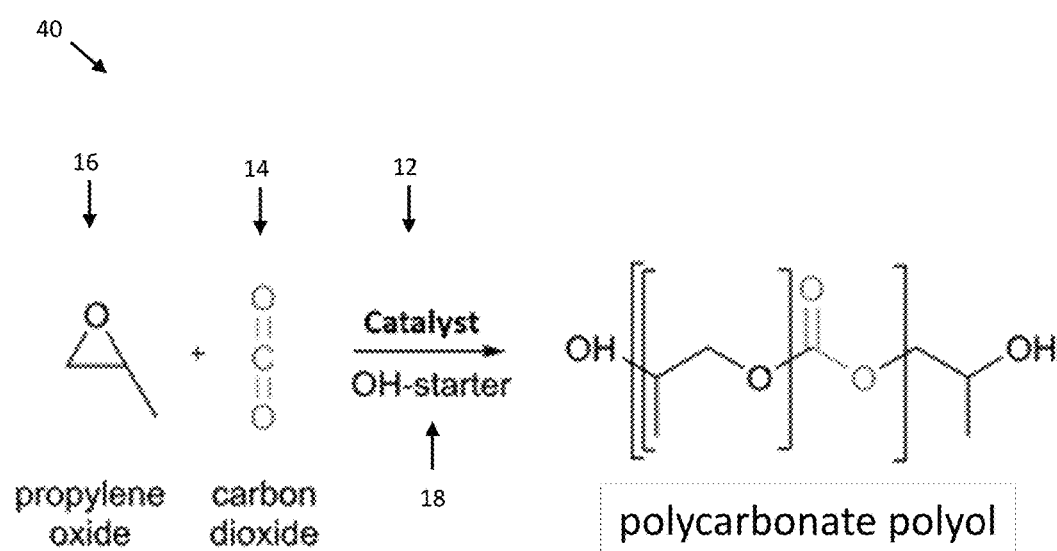
FIG. 2 depicts a reaction synthesizing a polyol, according to according to certain embodiments.

FIG. 2 depicts a reaction 40 synthesizing a polyol including the PO 16, the $CO_2$ 14, the starter 18, and the catalyst 12.

Systems

Figure 3:
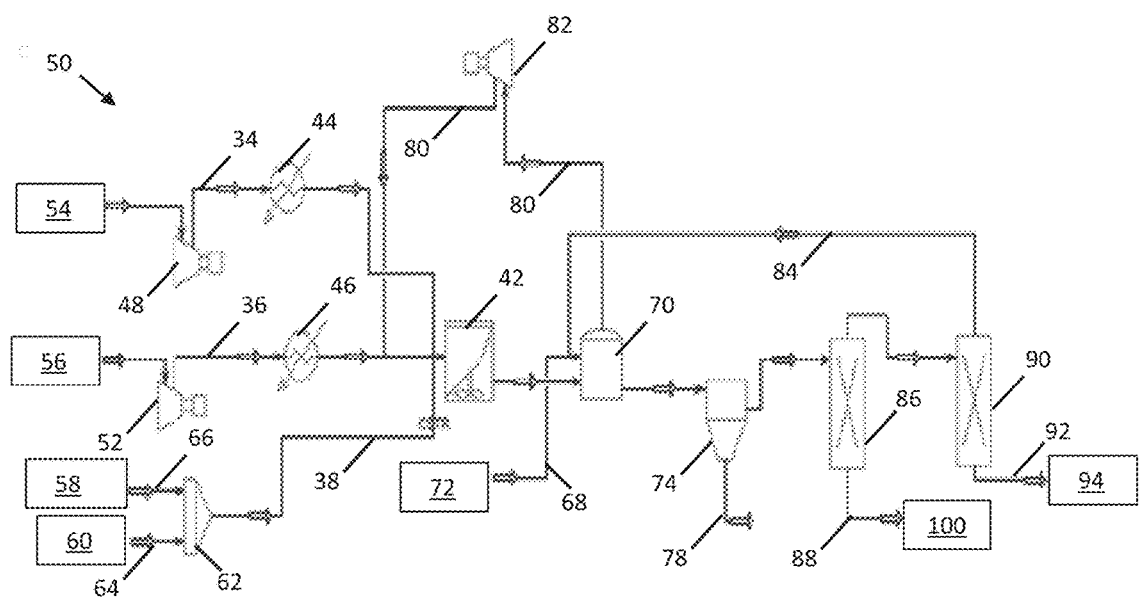
FIG. 3 illustrates a system for producing using a continuous polyol process, according to certain embodiments.

FIG. 3 illustrates a system 50 for producing polyols using a continuous polyol process, according to aspects of the present disclosed embodiments. The system may include a $CO_2$ feedline 34, a PO feedline 36, and a catalyst feedline 38, each fluidly coupled to a continuous stirred tank reactor (CSTR) 42. The $CO_2$ feedline 34 may include a $CO_2$ source 54 fluidly coupled upstream of a first compressor 48 which may be fluidly coupled upstream of a first heater 44, which may be fluidly coupled upstream of the continuous stirred tank reactor 42. Similarly, the PO feedline 36 may include a PO source 56 fluidly coupled upstream of a second compressor 52 which may be fluidly coupled upstream of a second heater 46, which may be fluidly coupled upstream of the continuous stirred tank reactor 42. The PO feedline 36, the PO source 56, the $CO_2$ feedline 34, and the $CO_2$ source (as well as optionally the first and second heaters 44, 46 and the first and second compressors 48, 52) may collectively form a reagent input subsystem, for introducing reagents into the CSTR 42. The catalyst feedline 38 may include a mixing vessel 62 for mixing catalyst and starter, for example di-propylene glycol (DPG) and/or p-toluenesufonic acid (PTSA). A starter feedline 66 may fluidly couple a starter source 58 to the mixing vessel 62 while a catalyst feedline 64 may fluidly couple a catalyst source 60 to the mixing vessel 62. In other embodiments, catalyst in solid state may be injected directly into the CSTR 42, separately from the starter injection. The catalyst feedline 64 and catalyst source 60 (and optionally the mixing vessel 62) may together form a solid catalyst input subsystem for the CSTR.

Referring still to FIG. 3, the system 50 may include a quench tank 70 fluidly coupled downstream of the CSTR 42, as well as a mix tank 74 fluidly coupled downstream of the quench tank 70. A $CO_2$/PO recycle line 80 may also be fluidly coupled at an outlet to the quench tank 70. The $CO_2$/PO recycle line 80 may include a third compressor 82, and may fluidly connect back to the PO feedline 36 and/or the $CO_2$ feedline 34 upstream of the CSTR 42, thereby allowing $CO_2$ and/or PO to be reused in the reaction (that is, within the CSTR 42). In some embodiments, the quench tank 70 may include an ionic exchange resin (not shown) to aid in the recovery of $CO_2$ 14 and/or PO 16. A solvent makeup line 68 may also be fluidly coupled to the quench tank 70 fluidly coupling the quench tank 70 to a solvent source 72 for solvents such as DBE (dibasic ester), DBE4, and $C_3PO_4$ (phosphoric acid). The system 50 may also include a mix tank 74 fluidly coupled downstream of the quench tank 70. The mix tank 74 may include a catalyst waste line 78 for dispensing of spent catalyst and/or for salvaging catalyst for reuse. As such, the mix tank 74 may be a solid catalyst separation unit. Downstream of the mix tank 74 or solid catalyst separation unit (and fluidly coupled thereto) the system 50 may include a product extraction vessel 86 (or polyol separation unit) including a product extraction line 88 for extracting the output product 100 (for example, polypropylene carbonate (PPC) polyols) from the system 50. The product extraction line 88 may include a heater (for example, a fourth heater, not shown) in order to keep the viscosity of the product 100 low. The product extraction vessel 86 (or polyol separation unit) may be fluidly coupled directly to the CSTR 42 or, in other embodiments may be indirectly fluidly coupled to the CSTR 42 via the mix tank 74 or solid catalyst separation unit.

Still referring to FIG. 3, the system 50 may include a separation vessel 90 fluidly coupled downstream of the product extraction vessel 86. The separation vessel 90 may include a byproducts extraction line 92 for extracting cyclic and other byproducts 94 from the system 50. The system 50 may also include a solvent recycle line 84 fluidly coupling the separation vessel 90 to the solvent makeup line 68 at a location upstream of the quench tank 70 (that is, the solvent recycle line 84 joins the solvent makeup line 68 prior to the solvent makeup line 68 joining the quench tank 70) such that solvents including DBE (dibasic ester), DBE4, and $C_3PO_4$ (phosphoric acid) may be recycled for reuse in the quench tank 70. The system 50 of the present disclosed embodiments may include other arrangements and configurations of components (and fluid couplings therebetween) than what is shown in FIG. 3 as long as the underlying function is substantially the same. In some embodiments, the system 50 may include other components not shown in FIG. 3, while in other embodiments, the system 50 may not include every component illustrated in FIG. 3. The CSTR 42 may include operating parameters in a range of about 3 bars to about 100 bars, and from about 20 degrees C. to about 300 degrees C. In other embodiments, the CSTR 42 may include operating parameters in a range of about 5 bars to about 60 bars, and from about 30 degrees C. to about 200 degrees C. In other embodiments, the CSTR 42 may include operating parameters in a range of about 15 bars to about 25 bars, and from about 30 degrees C. to about 50 degrees C.

FIGS. 4A-4E show process parameters as a function of process time during an exemplary continuous polyol process, according to aspects of the present embodiments.

Figure 4A:
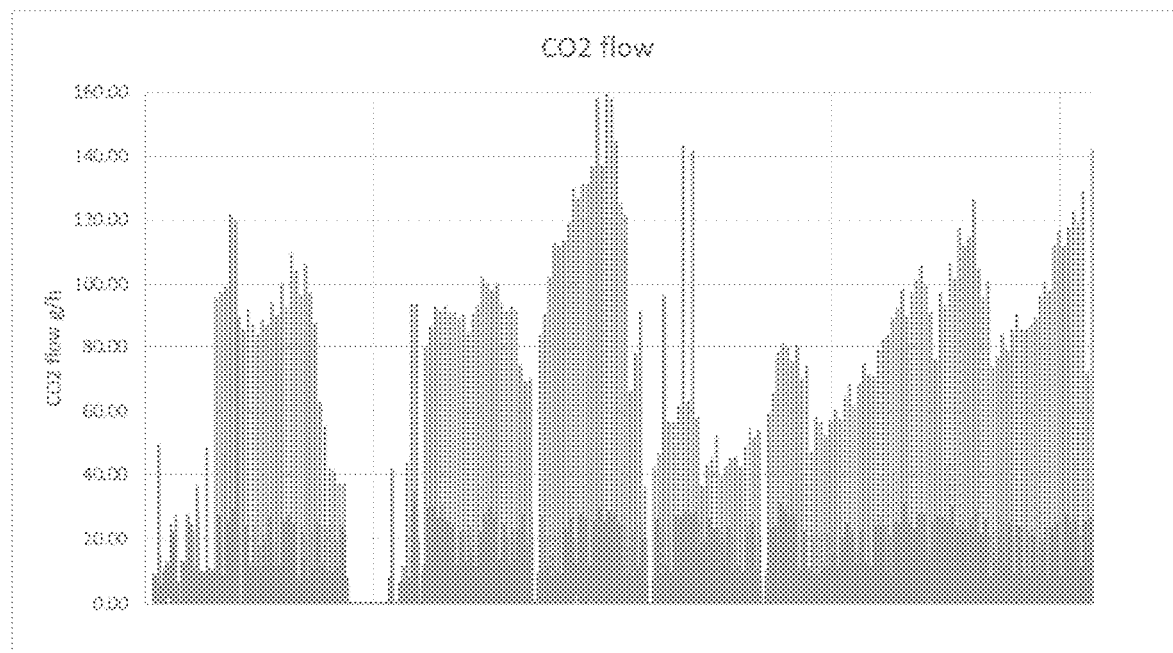
FIG. 4A shows process parameters as a function of process time during an exemplary continuous polyol process, according to certain embodiments.

FIG. 4A shows exemplary variation in $CO_2$ flow into CSTR 42, over a period of time. In one embodiment, the period may be from several minutes to several hours. In another embodiment, the system may be several minutes to one or more days, to several days.

Figure 4B:
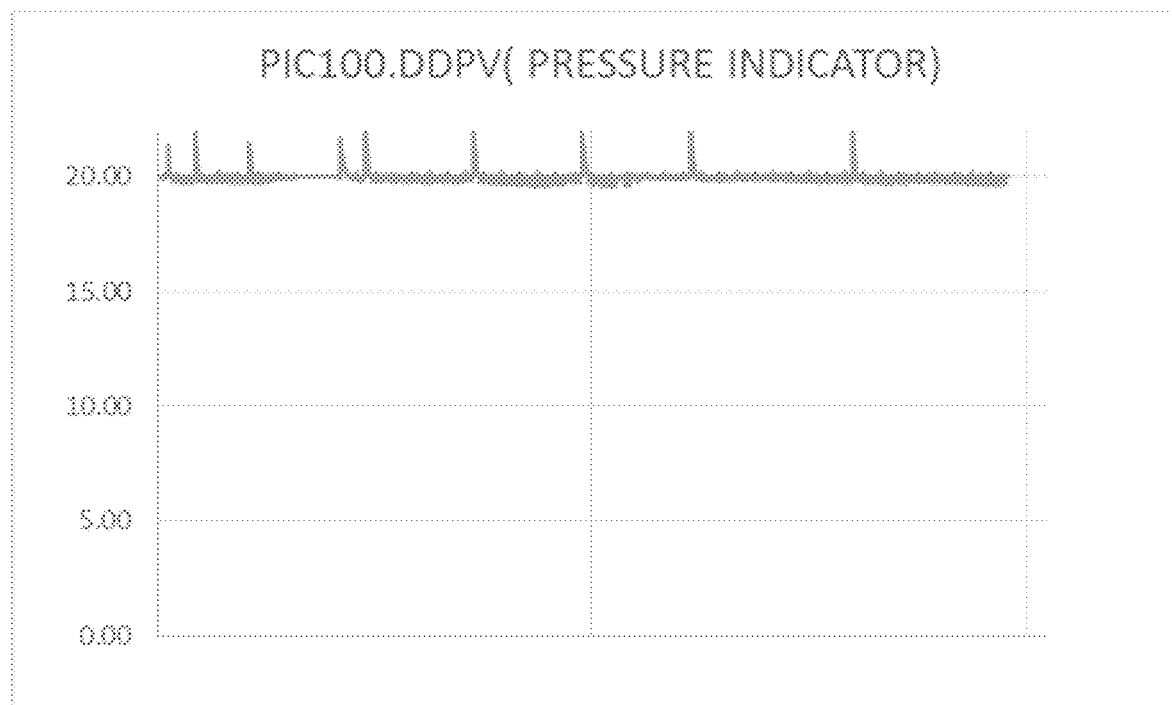
FIG. 4B shows process parameters as a function of process time during an exemplary continuous polyol process, according to certain embodiments.

FIG. 4B shows the variation in pressure (measured in bar) within the CSTR 42, over a period of time time. Each of the pressure spikes coincides with catalyst injection.

Figure 4C:
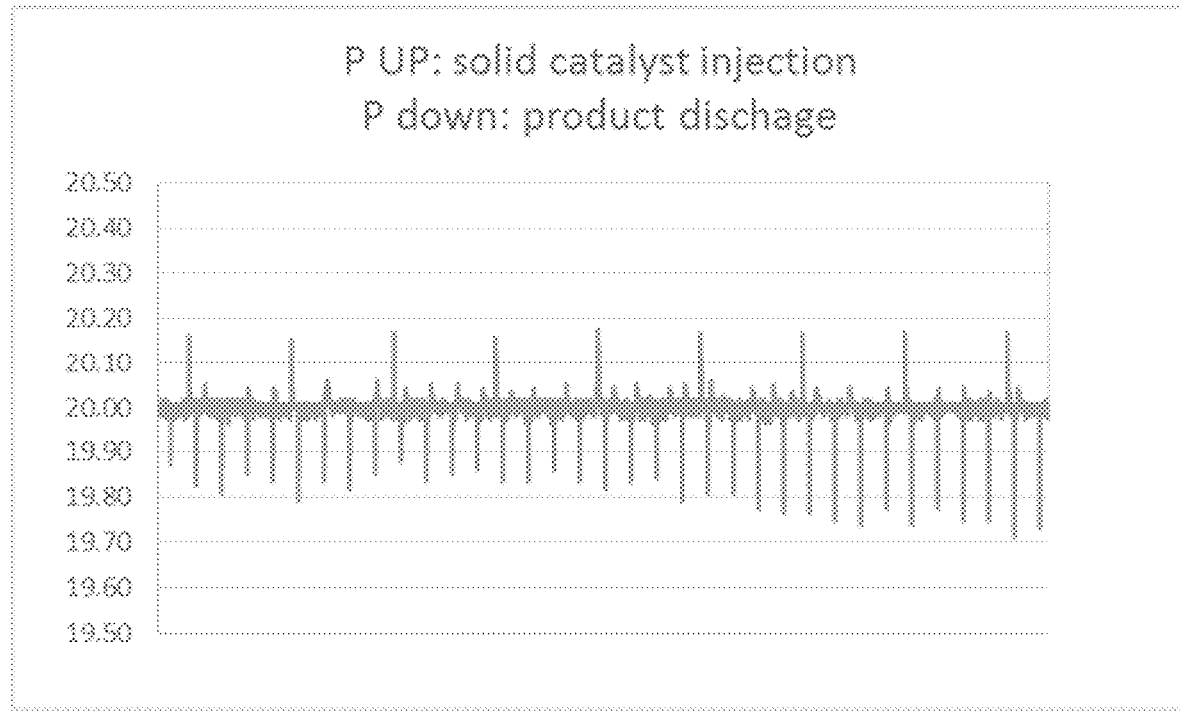
FIG. 4C shows process parameters as a function of process time during an exemplary continuous polyol process, according to certain embodiments.

FIG. 4C shows how pressure (measured in bar) within the CSTR 42 varies with catalyst injection as well as with discharge of the product. In the example shown in FIG. 4C, product 100 may be discharged at intervals approximately equal to the intervals at which catalyst is injected, with major (that is, higher volume) catalyst injections occurring about once every fourth product 100 discharge. In other embodiments, other amounts of catalyst and/or injection intervals may be required. As such, the intervals and size of catalyst injection may be varied. In some embodiments, catalyst is injected as frequently as possible. In large-scale processes, injection intervals and relative quantities of catalyst injection may be similar on a weight percent basis to smaller scale processes (for example, gas phase ethylene polymerization processes). In some embodiments, frequency of catalyst injections may be varied from once per hour down to once per second, including various intervals in between including once every 5 seconds, once every 10 second, once every 20 seconds, once every 30 seconds, once every minute, once every 5 minutes, once every 10 minutes, once every 15 minutes, once every 20 minutes, once every 30 minutes, and/or once every 45 minutes. In some embodiments, catalyst injection frequency may be from about 5 seconds to about 20 seconds. In other embodiments, catalyst injection may be from about 15 seconds to about 1 minute. In other embodiments, catalyst injection may be from about 30 seconds to about 5 minutes. In yet other embodiments, catalyst injection may be from about 1 minute to about 15 minutes. In still other embodiments, catalyst injection may be from about 5 minute to about 45 minutes. Product 100 may similarly be discharged at various ranges of intervals including from about 5 seconds to about 20 seconds, from about 15 seconds to about 1 minute, from about 30 seconds to about 5 minutes, from about 1 minute to about 15 minutes, and/or from about 5 minute to about 45 minutes.

Figure 4D:
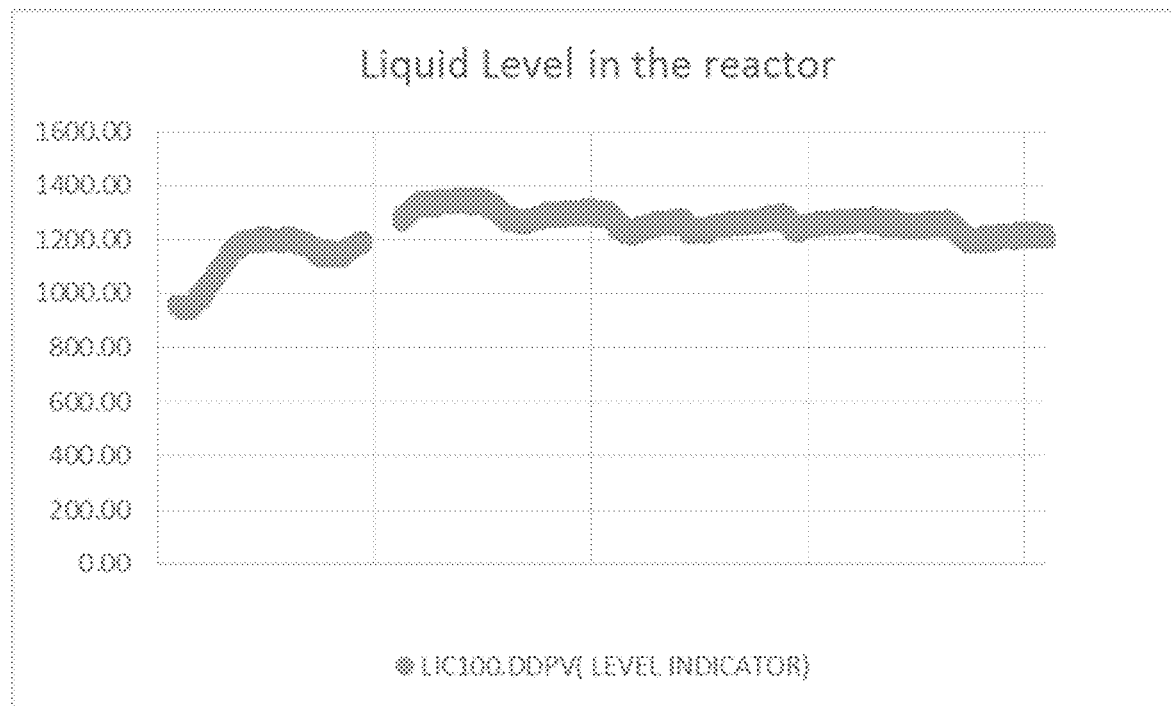
FIG. 4D shows process parameters as a function of process time during an exemplary continuous polyol process, according to certain embodiments.

FIG. 4D shows the liquid level in the CSTR 42, over a period of time. The liquid level in the CSTR 42 remains roughly constant (for example, from about 1000 mm to about 1400 mm, or from about 1200 mm to about 1400 mm).

Figure 4E:
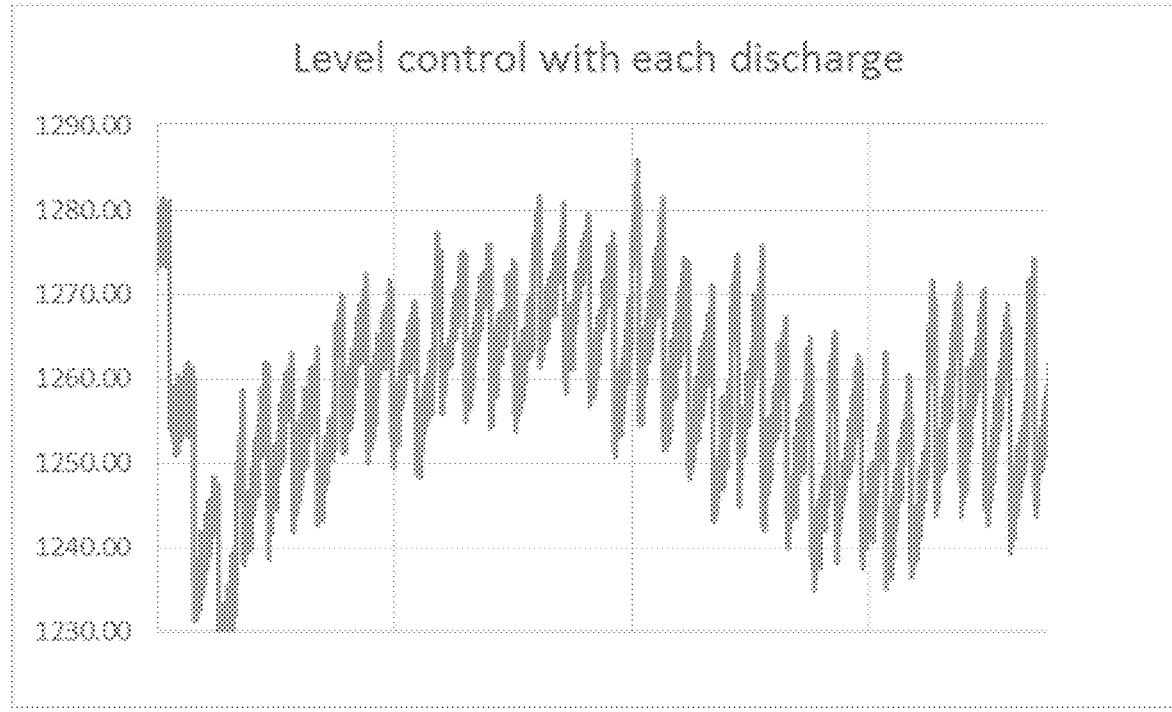
FIG. 4E shows process parameters as a function of process time during an exemplary continuous polyol process, according to certain embodiments.

FIG. 4E shows a close-up view of the liquid level in the CSTR 42, over a period of time. FIG. 4E illustrates that even though the liquid level in the CSTR 42 remains roughly constant, the level cyclically varies with each catalyst injection and product discharge. For example, the level in the CSTR 42 may vary by about 20 mm during each injection/discharge cycle. In some embodiments, the liquid level in the CSTR 42 during each injection/discharge cycle may vary by about 18 mm to about 22 mm, or from about 15 mm to about 25 mm, or from about 10 mm to about 30 mm.

Figure 5:
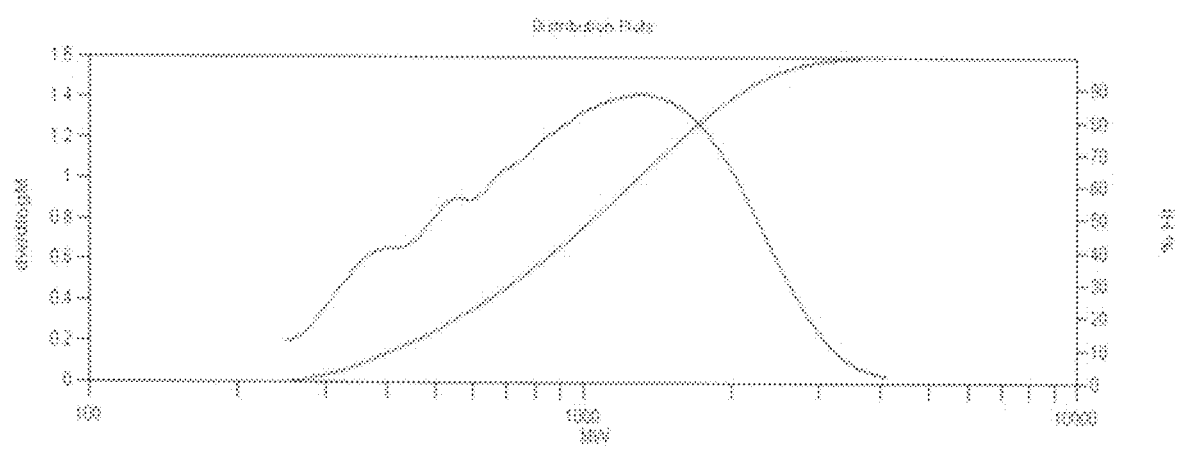
FIG. 5 shows molecular weight (and its distribution) of polyols synthesized by an exemplary continuous polyol process, according to certain embodiments.

FIG. 5 depicts molecular weight (and its distribution) of polyols synthesized by an exemplary continuous polyol process.

EXAMPLES

The present invention is illustrated by the following examples. It is to be understood that the particular examples, materials, amounts, and procedures are to be interpreted broadly in accordance with the scope and spirit of the invention as set forth herein.

Examples 1-3 were performed by the CSTR process including the following steps (as shown in FIGS. 1-4 and as generally described above):

1. Feed $CO_2$, PO, starter and solid catalyst into the CSTR.
2. Withdraw the PPC polyol product continuously.
3. Separate PO and $CO_2$ to recycle back at an elevated temperature via a liquid/gas separator.
4. Optionally, add solvent, such as DBE to dilute the PPC polyol.
5. Optionally, pass the PPC polyol through an ionic exchange resin to remove and/or optional recovery the solid catalyst.
6. Optionally, discharge PPC polyol product in solvent.
7. Optionally, remove solvent to get pure PPC polyols.

Gel permeation chromatography (GPC) was used to determine the composition of collected samples.

Example 1

A trial was started by injecting a 3 g of catalyst directly into a continuous stirred tank reactor (CSTR 42) with a volume of 3 liters. The reaction picked up immediately with $CO_2$ flow at 60 g/h with PO flow rate at 80 g/h (PO:CO2=1:1), DPG flow rate at 18 g/h (DPG:PO=1:10) and catalyst flow at 0.16 g/h. The pressure was 20 bar, and the temperature was 35° C. The liquid level in the CSTR dropped quickly from 1060 mL to 950 mL. It is contemplated that the liquid level drop was due to a viscosity change. The sample became more viscous than before the reaction.

Example 2

The reactor was recharged, and the reaction picked up after 2 hrs ($CO_2$ flow rate=25 g/h, PO flow rate=33 g/h, DPG flow rate=7.6 g/h and catalyst flow rate=0.07 g/h). The reaction was started with 0.5 g of the catalyst. The resident time was 24 h. The molecular weights and PDI were measured as follow:

6 h, Mn=620, PDI=1.2
20 h, Mn=800, PDI=1.2
32 h, Mn=870 PDI=1.2 (Sample contains ~15% PO)
51 h, Mn=990 PDI=1.3
72 h, Mn=1000, PDI=1.4
96 h, Mn=1170, PDI=1.4

Example 3

The reactor was recharged, and the reaction picked up after 2 hrs ($CO_2$ flow rate=140 g/h, PO flow rate=185 g/h, DPG flow rate=42 g/h and catalyst flow rate=0.4 g/h). The production rate was increased to 360 g/h and the resident time was about 5 hours. The production rate was increased to 360 g/h and the molecular weight and PDI were monitored with time:

29 h: Mn=1191 PDI=1.37
45 h: Mn=1172, PDI=1.43
52 h: Mn=1135; PDI=1.45

FIG. 4 shows certain process conditions during the course of a reaction. The upside-down $CO_2$ pattern implies that the product discharged. The reaction conditions such as pressure and temperature were also fixed during all trials while the liquid level in the reactor was continuously increasing due to the production of polyol. The pressure was maintained at or around. 20 bars while the temperature was maintained at a temperature range from about 30 degrees C. to about 50 degrees C. Samples were taken at interval periods to measure the molecular weight and the PDI.

Certain Definitions

In order for the present disclosure to be more readily understood, certain terms are first defined below. Additional definitions for the following terms and other terms are set forth throughout the specification.

The term "aliphatic" as used herein denotes a hydrocarbon moiety that may be straight-chain (i.e., unbranched), branched, or cyclic (including fused, bridging, and spirofused polycyclic) and may be completely saturated or may contain one or more units of unsaturation, but which is not aromatic. Unless otherwise specified, aliphatic groups contain 1-30 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, silicon, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated, or partially unsaturated groups.

The term "unsaturated", as used herein, means that a moiety has one or more double or triple bonds.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

An apparatus, system, or method described herein as "comprising" one or more named elements or steps is open-ended, meaning that the named elements or steps are essential, but other elements or steps may be added within the scope of the apparatus, system, or method. To avoid prolixity, it is also understood that any apparatus, system, or method described as "comprising" (or which "comprises") one or more named elements or steps also describes the corresponding, more limited apparatus system, or method "consisting essentially of" (or which "consists essentially of") the same named elements or steps, meaning that the apparatus, system, or method includes the named elements or steps and may also include additional elements or steps that do not materially affect the basic and novel characteristic(s) of the system, apparatus, or method. It is also understood that any apparatus, system, or method described herein as "comprising" or "consisting essentially of" one or more named elements or steps also describes the corresponding, more limited, and closed-ended apparatus, system, or method "consisting of" (or "consists of") the named elements or steps to the exclusion of any other unnamed element or step. In any apparatus, system, or method disclosed herein, known or disclosed equivalents of any named element or step may be substituted for that element or step.

As used herein, "about" with reference to a numerical range may be interpreted to include the upper and lower range limits surrounded by a tolerance equal to 5% of the span of value of the range (for example, a tolerance of 5% of the difference between upper range limit and the lower range limit).

As used herein, "a" or "an" with reference to a claim feature means "one or more," or "at least one."

As used herein, the term "substantially" refers to the qualitative condition of exhibiting total or near-total extent or degree of a characteristic or property of interest.

EQUIVALENTS

It is to be understood that while the disclosure has been described in conjunction with the detailed description thereof, the foregoing description is intended to illustrate and not limit the scope of the invention(s). Other aspects, advantages, and modifications are within the scope of the claims.

This written description uses examples to disclose the invention, including the best mode, and also to enable any person skilled in the art to practice the present embodiments, including making and using any devices or systems and performing any incorporated methods. The scope of the present embodiments is not intended to limit the scope of the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of continuously producing a polycarbonate polyol, the method comprising:
   i) feeding a solid catalyst into a continuous stirred tank reactor (CSTR);
   ii) adding one or more epoxides and carbon dioxide to the CSTR thereby forming a reaction mixture;
   iii) contacting the reaction mixture comprising one or more epoxides and carbon dioxide with the solid catalyst and a chain transfer agent comprising a plurality of sites capable of initiating copolymerization of epoxides and carbon dioxide in the CSTR;
   iv) allowing polymerization reaction to proceed until a desired molecular weight polyol has formed; and
   v) terminating the polymerization reaction,
   wherein a polydispersity index of the polyol is within a range from about 1.2 to about 1.45, and
   wherein a viscosity of the polyol at 75 degrees C. is within a range from about 100 centipoise to about 10,000 centipoise.

2. The method of claim 1, wherein a moisture tolerance level of the polymerization reaction is within a range from about 100 ppm to about 500 ppm.

3. The method of claim 1, wherein the solid catalyst is activated prior to the feeding step.

4. The method of claim 1, wherein the solid catalyst comprises a metal coordination compound comprising a permanent ligand set and at least one ligand that is or comprises a polymerization initiator.

5. The method of claim 1, wherein the one or more epoxides and the carbon dioxide are added separately, and wherein the adding steps are continuous.

6. The method of claim 1, further comprising:
   continuously providing the chain transfer agent to the CSTR; and continuously supplying a solvent to the CSTR.

7. The method of claim 1, further comprising:
separating the solid catalyst after the terminating step, wherein the solid catalyst is removed via an ionic exchange resin.

8. The method of claim 1, further comprising:
discharging the polycarbonate polyol from the CSTR after the polymerization reaction, and
separating the polycarbonate polyol.

9. The method of claim 1, wherein a flow rate of the carbon dioxide is within a range from about 20 g/h to about 100 g/h.

10. The method of claim 9, wherein a production rate of the polycarbonate polyol is within a range of about 200 g/h to about 1000 g/h,
wherein a number average molecular weight of the polycarbonate polyol is within a range of about 750 to about 1500 g/mol, and
wherein a residence time of the reaction mixture is within a range of about 12 hours to about 24 hours.

11. A polyol obtained by and/or obtainable by the method of claim 1.

12. A method of continuously producing a polycarbonate polyol, the method comprising:
i) feeding a solid catalyst into a continuous stirred tank reactor (CSTR);
ii) adding one or more epoxides and carbon dioxide to the CSTR thereby forming a reaction mixture;
iii) contacting the reaction mixture comprising one or more epoxides and carbon dioxide with the solid catalyst and a chain transfer agent comprising a plurality of sites capable of initiating copolymerization of epoxides and carbon dioxide in the CSTR;
iv) allowing polymerization reaction to proceed until a desired molecular weight polyol has formed; and
v) terminating the polymerization reaction
where a moisture level of the reaction mixture is below a moisture tolerance level of the polymerization reaction, and
wherein the method does not include drying either the reaction mixture or the chain transfer agent prior to the polymerization reaction.

13. A method of continuously producing a polycarbonate polyol, the method comprising:
i) feeding a solid catalyst into a continuous stirred tank reactor (CSTR);
ii) adding one or more epoxides and carbon dioxide to the CSTR thereby forming a reaction mixture
iii) contacting the reaction mixture comprising one or more epoxides and carbon dioxide with the solid catalyst and a chain transfer agent comprising a plurality of sites capable of initiating copolymerization of epoxides and carbon dioxide in the CSTR;
iv) allowing polymerization reaction to proceed until a desired molecular weight polyol has formed; and
V terminating the polymerization reaction
wherein there is no observable induction time of the solid catalyst subsequent to reactor startup, and
wherein the solid catalyst is not activated prior to the feeding step.

* * * * *